(12) United States Patent
Vilain

(10) Patent No.: US 8,232,524 B2
(45) Date of Patent: Jul. 31, 2012

(54) HIGHLY ISOLATED THERMAL DETECTOR

(75) Inventor: Michel Vilain, Saint Georges de Commiers (FR)

(73) Assignee: ULIS, Veurey Voroize (FR)

( * ) Notice: Subject to any disclaimer, the term of this patent is extended or adjusted under 35 U.S.C. 154(b) by 382 days.

(21) Appl. No.: 12/398,427

(22) Filed: Mar. 5, 2009

(65) Prior Publication Data

US 2009/0266986 A1 Oct. 29, 2009

(30) Foreign Application Priority Data

Apr. 29, 2008 (FR) .................................... 08 52864

(51) Int. Cl.
*G01J 5/00* (2006.01)
(52) U.S. Cl. .................................. 250/338.3; 250/338.4
(58) Field of Classification Search ............... 250/338.3, 250/338.4
See application file for complete search history.

(56) References Cited

U.S. PATENT DOCUMENTS

| 5,021,663 | A | | 6/1991 | Hornbeck |
| 5,777,328 | A | | 7/1998 | Gooch |
| 6,034,374 | A | | 3/2000 | Kimura et al. |
| 6,087,661 | A | * | 7/2000 | Owen et al. .................... 250/332 |
| 6,094,127 | A | | 7/2000 | Yong |
| 6,144,030 | A | | 11/2000 | Ray et al. |
| 6,144,285 | A | * | 11/2000 | Higashi ............................ 338/15 |
| 6,165,587 | A | * | 12/2000 | Nonaka ......................... 428/119 |
| 6,552,344 | B1 | | 4/2003 | Sone et al. |
| 6,690,014 | B1 | * | 2/2004 | Gooch et al. ................ 250/338.4 |
| 2002/0179837 | A1 | | 12/2002 | Ray |
| 2004/0232337 | A1 | * | 11/2004 | Vilain ......................... 250/338.1 |
| 2005/0098727 | A1 | * | 5/2005 | Vilain ......................... 250/338.1 |

FOREIGN PATENT DOCUMENTS

| FR | 2 788 885 A1 | 7/2000 |
| FR | 2 827 707 A1 | 1/2003 |
| FR | 2 885 408 A1 | 11/2006 |

* cited by examiner

*Primary Examiner* — David Porta
*Assistant Examiner* — Shun Lee
(74) *Attorney, Agent, or Firm* — Burr & Brown

(57) ABSTRACT

A detector for detecting electromagnetic radiation includes a substrate and at least one microstructure including a radiation-sensitive membrane extending substantially opposite and away from the substrate. The membrane is mechanically attached to at least two longilinear, collinear retention elements, at least one of which is mechanically connected to the substrate by an intermediate post. The membrane is in electrical continuity with the substrate. At least two collinear legs are attached to each other at the level of their ends which are attached to the membrane by a mechanical connector which is substantially co-planar with the legs and membrane. The other end of at least one of the legs is integral with a rigid cross piece which is substantially co-planar with the legs and extends substantially at right angles relative to the main dimension of the legs. The cross piece is integral with the post which is integral with the substrate.

14 Claims, 4 Drawing Sheets

Priort Art

Cross section
Through AA
In Figure 2

HIGHLY ISOLATED THERMAL DETECTOR

FIELD OF THE INVENTION

The present invention relates to the field of detecting electromagnetic radiation, more precisely imaging and thermal pyrometry. More particularly, the present invention relates to a device for detecting infrared radiation comprising an array of elementary thermal detectors.

BACKGROUND OF THE INVENTION

In the field of detectors used for infrared imaging or thermography (pyrometry), the use of devices configured in the form of an array and capable of operating at ambient temperature, i.e. not requiring cooling to extremely low temperatures, is known—in contrast to detecting devices referred to as "quantum detectors" which can only operate at extremely low temperature. Generically, uncooled detectors are referred to as "thermal detectors".

These detectors traditionally use the variation in a physical value of an appropriate material or an assembly of appropriate materials as a function of temperature at around 300 K. In the particular case of the most widely-used bolometric detectors, this physical value is electrical resistivity, but other values such as dielectric constant, polarization, thermal expansion, refractive index, etc. can be used.

Such an uncooled detector generally includes:
- means of absorbing the thermal radiation and converting it into heat;
- means of thermally isolating the detector so that its temperature can rise due to the effect of the thermal radiation;
- thermometric means which, in the context of a bolometric detector, use a resistance element, the resistance of which varies with temperature;
- and means of reading electrical signals provided by the thermometric means.

Detectors designed for thermal or infrared imaging are conventionally produced as a one- or two-dimensional array of elementary detectors, said detectors being suspended above a substrate, which is generally made of silicon, by means of support legs.

The substrate usually incorporates means of sequentially addressing the elementary detectors, means of electrically exciting the elementary detectors and means of pre-processing the electrical signals generated by these elementary detectors. This substrate and the integrated means are commonly referred to as the "readout circuit".

In order to obtain a scene using this detector, the scene is projected through suitable optics onto the array of elementary detectors and clocked electrical stimuli are applied via the readout circuit to each of the elementary detectors or to each row of such detectors in order to obtain an electrical signal that constitutes an image of the temperature reached by each of said elementary detectors. This signal is then processed to a greater or lesser extent by the readout circuit and then, if applicable, by an electronic device outside the package in order to generate a thermal image of the observed scene.

An elementary detector is formed by a thin membrane (of the order of 0.1 to 0.5 µm) fixedly held suspended parallel to the substrate with the aid of thermally isolating support structures usually referred to as "legs". At least some of these structures also act as an electrical link between the contacts made on the surface of the readout circuit and the electrically active parts of the membrane. In addition to the sensitive material, the membrane consists of materials used in order to maximize absorption of the thermal radiation to be detected, for example using a conductive layer having an appropriate sheet resistance, usually in conjunction with a reflector located on the surface of the substrate. This reflector is designed to increase absorption in the vicinity of a given wavelength, usually between 8 and 14 µm, due to the quarter-wave effect. The gap between the membrane and the reflector is consequently adjusted to around 2 to 2.5 µm. These types of construction are very familiar to those skilled in the art.

The essential performance of such a detector is expressed by its thermal resolution or NEDT (stands for *Noise Equivalent Differential Temperature*). This quantity is primarily determined by the thermal resistance $R_{th}$ seen between the membrane and the substrate which is kept at a temperature that is essentially constant.

This quantity $R_{th}$ is essentially defined by the constituent materials and the geometry of the support legs. One of the ends of these legs is integral with the body of the membrane and the other end of these legs is integral with the substrate via an intermediate anchoring structure. Quantity $R_{th}$ is first-order proportional to length and inversely proportional to the width and thickness of the legs (assuming they are made of a single material for the sake of simplicity). It is therefore preferable to use materials which have high thermal resistivity and are very rigid as constituent materials of the legs. Silicon nitride is highly suitable from this point of view and is therefore very widely used together with a very thin (several nanometers) electrically conductive layer which is necessarily integral with at least two legs per elementary detector in order to ensure electrical continuity between at least two connection points formed on the surface of the readout circuit and the electrically active structures of the membrane of the elementary detector.

The main problem encountered in obtaining optimal performance is that of defining maximum thermal resistance while ensuring satisfactory geometrical stability of the suspended sensitive membrane. In fact, reducing the thickness and width of the legs and any increase in their length quickly reaches a limit beyond which rigidity becomes insufficient. In other words, elastic deformation becomes excessive and makes it impossible to accurately secure the membrane over the substrate, given the fact that the thickness of the quarter-wave sheet must be essentially uniform in order to obtain uniform, constant spectral responsivity from one detector to another.

The usual solution adopted to solve this problem is to concentrate on the length parameter by increasing the length of the legs between their attachment point and the point at which they merge into the membrane along one or two or even more adjacent edges of the membrane. This twisted confirmation necessarily requires the use of materials which are relatively thick in the field in question (several hundred nanometers) with a width of at least the same order in order to effectively support a typical membrane having an edge size of 25 µm. As a result, this concept is intrinsically limited in terms of the $R_{th}$ value which can be achieved in practice because of the resulting loss of rigidity.

What is more, this arrangement limits the fill factor of the structure which expresses the efficiency with which it collects the radiative energy that is to be detected. In fact, legs that are thus lengthened inactivate, at least partially because this is not their primary objective, part of the footprint of the elementary detector and this inactivation is proportionally greater relative to the total surface area if the legs are extended.

One solution to this new problem involves dedicating a first constructional level to lengthening the legs, typically in the form of coils which snake to and fro parallel to one edge as disclosed, for instance, in documents U.S. Pat. Nos. 6,034, 374, 6,094,127 or 6,144,030. The absorbent, sensitive membrane is formed at a second superposed constructional level and is connected to the end of the subjacent legs opposite the points where they are anchored to the substrate. This results in high thermal resistances but unlimited reduction of the thickness and width of the legs nevertheless remains impossible because of the mechanical reasons mentioned above and which are exacerbated in this case. Also, because the presence of legs between the substrate and the membrane interferes with the quarter-wave resonance effect, it becomes necessary to complicate the structure considerably by producing:

- either legs with high reflectance in order to produce the reflector effect on the actual legs. This effect is bound to be imperfect and results in an increase in the thermal conductance of the legs which is contrary to the sought-after objective;
- or by interposing a reflector supported by its own anchoring points and provided with perforations which, once again, are contrary to the sought-after objective at a third intermediate constructional level between the legs and the membrane. A construction of this type is described, for example, in document US 2002/0179837A1.

These extremely complex structures result in devices that are expensive to fabricate, firstly due to the very large number of technological processes that need to be performed and the unavoidably low yields associated with them and secondly due to the technological dispersion caused by the multiplicity of processes that they involve.

One solution which imposes far fewer restrictions in this respect involves only constructing linear legs with one of their ends being secured by anchoring structures designed to physically attach to the substrate, the other end being integral with the body of the membrane and assembling these legs in collinear pairs. FIG. 1 shows a typical example of this type of construction in accordance with the prior art. It is understood that at least two legs must be electrically conductive and in continuity with the connections formed on the surface of the readout circuit so as to address the resistance formed in the membrane. A structure of this type with only two legs is described, for example, in U.S. Pat. No. 5,021,663. Mechanical retention of membranes is then valid even for much thinner leg thickness (of the order of 15 to 50 nm for usual materials and pixels having an edge dimension of around 25 µm) without making it necessary to complicate the structure or to reduce the fill factor substantially. The fill factor remains high because the legs (or pairs of legs arranged along a common axis) do not exceed the length of an edge or a diagonal of the membrane.

It is then possible to obtain very high $R_{th}$ values with a good fill factor without resorting to complicated constructions. However, the limitations associated with this prior art reappear with small juxtaposition pitches which are encountered in the case of elementary detectors used to form arrays, typically below 25 µm. Firstly, because the anchoring points on the substrate are necessarily relatively solid and essentially arranged along the axis of the legs for mechanical reasons, their overall size limits the linear length of the legs. Also, the anchoring points are usually formed with a lateral extension (in both dimensions parallel to the plane of the substrate) which becomes non-negligible with these very small pitches relative to the surface area available on the footprint of an elementary pixel. This results in a reduced membrane fill factor.

An estimate of the construction constraints encountered is given below in relation to FIGS. 1 and 2. In the most usual case of detector arrays having a pitch of 25 µm, assuming favorable, practical cases where the anchoring structures are each common to two adjacent detectors, as shown in FIG. 1, and assuming that an anchoring structure 4 occupies an area of roughly 5×5 µm, pairs of legs 3 can be extended by a total of approximately 15 to 17 µm, assuming a gap of 3 to 5 µm has to be left in order to attach the membrane to each pair of legs. This results in the formation of satisfactory thermal resistance compared with the other construction possibilities mentioned above, even though each membrane according to FIG. 1 is supported by four legs rather than two legs as in another embodiment of the prior art such as that shown, for example, in Document U.S. Pat. No. 5,021,663.

Transferring this exercise to an array repetition pitch of 17 µm, the total extension of the pairs of legs must not exceed 9 to 11 µm, although it is relatively difficult to reduce the widths and thicknesses because they are imposed by other technological constraints. Also, the useful surface area for extending the membrane which collects radiative energy relative to the area of the elementary detector is reduced by around 10 to 15% and this is penalizing because the aim is always to achieve maximum performance. The budget, in terms of sensitivity, is reduced by 40 to 50%. Given the fact that the incident radiative energy on the surface area of an elementary detector is already reduced by a factor of more than 2 when two detectors having respective pitches of 25 and 17 µm are compared, these findings show that attempting to achieve sensitivity with very small array pitches is highly problematic.

The crucial need to achieve performance gains for small array pitches, preferably without complicating their structure, is therefore readily apparent.

This geometrical limitation of the anchoring structures is associated firstly with the need to obtain, reliably and statistically dependably, electrical connectivity between the potentials monitored by the readout circuit and the electrical functions of the membrane via the support legs and secondly with the need to ensure mechanical rigidity of the assembly relative to the substrate. Producing the anchoring structures requires the use of several materials, each of which must be defined by a particular lithographic and etching process which meets printed circuit artwork rules which cannot be relaxed arbitrarily. A final overall size of around 5×5 µm is comfortable and 4×4 µm obtained using more stringent techniques and inspections represents a good realization compromise using ordinary tried-and-tested professional techniques.

The object of the invention is therefore to propose thermal detectors of simple construction which offer performance better than that of detectors according to the prior state of the art, regardless of the array pitch and, in particular, with small array repetition pitches. The invention solves the problem of overcoming the limits which prevent the realization of high thermal resistances, not only at the level of structures for anchoring to the substrate in a first embodiment, but also and possibly cumulatively, at the level of integral attachment of the legs to the sensitive membrane in a second embodiment. The concept can be extended in accordance with a third embodiment which gives an even greater improvement in sensitivity.

SUMMARY OF THE INVENTION

To achieve this, the object of the invention is a particular arrangement and construction of points used to anchor the thermally isolating legs to the substrate and/or points where the legs join the body of the membrane, the assembly being formed at a single constructional level in a manner which overcomes the geometrical limitations associated with the prior art, while maintaining all the advantages of simple fabrication.

The invention relates to a device for detecting electromagnetic radiation, especially infrared radiation, comprising a substrate and at least one microstructure comprising a membrane which is sensitive to said radiation and extends substantially opposite and away from said substrate, said membrane being directly or indirectly mechanically attached to at least two longilinear, collinear retention elements or support legs, at least one of which is mechanically connected to the substrate by an intermediate post, said membrane also being electrically connected to the substrate.

According to the invention, at least two collinear legs are integral with each other at the level of their ends which are attached to the membrane directly or indirectly by means of a mechanical connector which is essentially co-planar with the legs and the membrane, the other end of at least one of said legs being attached to a rigid cross piece which is essentially co-planar with the legs and extends substantially at right angles relative to the main dimension of said legs, said cross piece itself being integral with a post which is integral with the substrate.

It should be noted that because of the invention's distinctive method of attaching the legs, the overall size of the anchoring points consisting of the cross piece and the pillar is reduced compared with devices according to the prior art.

In a second implementation of the invention, said legs, referred to hereinafter as "first legs", are indirectly attached to the membrane by means of intermediate collinear legs which are parallel to said first legs, one of the ends of which is attached to the membrane at the level of a cross piece which is integral with said membrane which is essentially co-planar with the leg and said membrane, the other end of said intermediate legs being integral with the first legs at the level of a mechanical connector.

According to the second embodiment, said cross pieces of a single membrane are attached to each other by means of a rigid element which is integral and co-planar with the membrane and, advantageously, even constitutes the latter. In the latter case, the membrane must itself be sufficiently rigid to prevent relative elastic movement of the parts that form cross pieces because such movement would release the intermediate legs, consequently causing a membrane retention fault.

In one version of the above embodiment, said cross pieces are not attached to each other directly on the membrane; they are attached to each other through a rigid longilinear element which is parallel to the legs and are connected to the membrane by means of a third set of two collinear legs which are parallel to the preceding legs, one of the ends of which is attached to said cross pieces and the other end of which is integral with said membrane at the level of a mechanical connector.

Advantageously, these various elements are co-planar or substantially co-planar.

According to the invention, the cross piece, regardless whether it is a cross piece attached to the post or a cross piece directly or indirectly associated with the membrane, is formed by at least one layer of a rigid material which is in fall contact with layers that constitute the legs and layers that constitute the membrane. This stipulation supplements the words "substantially co-planar" and denotes that all these layers are deposited on top of each other without any intermediate sacrificial layer so that they adhere to each other transitively. This cross piece has an elongated shape at right angles to the axis, i.e. to the length of the legs, and is essentially arranged in the same plane parallel to the substrate, this plane also contains the legs and the membrane. This layout where all these components are co-planar in accordance with the information provided concerning this term is conducive to ensuring an assembly of very simple construction.

This cross piece advantageously has, at least at the end which is connected to the end of the leg, a width which is negligible compared with the length of the leg. Typically and advantageously, it has a width, at least at the end which is connected to the leg, which is approximately the same as that of the leg.

The post involved in the first embodiment forms a substantially vertical structure (perpendicular to the surface of the substrate), the lower part of the post being integral with the substrate and the upper part of the post being integral with the cross piece.

Although this fact is well known, it should be noted that a membrane is supported by at least two conductive legs which must be in electrical continuity with the cross piece which is integral with them and that this therefore also comprises at least one conductive layer. However, not all the cross pieces are necessarily provided with this conductive layer.

Said cross piece which is placed in electrical continuity must be in electrical continuity with a post which is itself conductive in order to ensure overall electrical continuity between the contacts on the surface of the substrate and the electrical functions in the membrane. However, not all the posts are necessarily conductive.

Similarly, in the second embodiment, at least two conductive legs are integral with cross pieces comprising at least one conductive layer in electrical continuity with the active structures of the membrane.

Not all the legs, cross pieces and posts that relate to a membrane are necessarily conductive. Those skilled in the art will easily be able to define which structures will be provided with conductive or non-conductive constituents, depending on the electrical continuity which they intend to establish in order to obtain functionality of the detector in accordance with the invention without there being any need to discuss this aspect in greater detail.

The cross piece and posts in the first implementation are substantially isothermal with the substrate. In other words, the observable temperature differences inside the anchoring structure, consisting of the cross piece and the post, relative to the substrate are negligible compared with the differences that occur over the length of the legs when the detector is functioning. This characteristic is favorable when it comes to avoiding thermal interference between adjacent detectors in certain embodiments of the invention, for example that in FIGS. 2 and 5, but is not an essential or even a preferred feature of the invention.

Similarly, each of the cross pieces integrated into the suspended parts in the secondary embodiments is essentially isothermal in the same sense of the term. In other words, thanks to their construction, there is no significant temperature difference between their various parts, especially from one end to another, when the detector is functioning. This characteristic makes it possible to distinguish them from the setups that constitute the thermally isolating legs.

When applied to the cross piece, the term "rigid" denotes, in the context of the present invention, the use of at least one layer which is absent from the legs which are, in contrast, regarded as non rigid because, as indicated earlier, it is advantageous to use especially small thicknesses and widths in their construction in order to achieve the sought-after goal of high performance. This layer or set of layers which substantially forms the cross piece is not capable of substantial deformation during normal operation of the detector—this would not typically be the case with legs that were locally extended, in the absence of said cross piece, over the same horizontal dimensions as the cross piece. The thickness of the cross piece is therefore typically substantially greater than that of the legs and the cross piece is preferably formed from mechanically rigid materials.

Advantageously, the constituent materials of the legs extend over the footprint of said cross piece as far as the top of said post or as far as inside the membrane, depending on the embodiment, so as to provide electrical connectivity which is easy to realize when necessary and so as to provide adequate mechanical strength between the end of the legs and the structures which keep them linearly tensioned.

BRIEF DESCRIPTION OF THE DRAWINGS

The invention will be made more readily understandable by the following description, the details of which are given merely by way of example and provided in relation to the enclosed drawings in which identical references relate to identical components.

DETAILED DESCRIPTION OF THE INVENTION

Figure 1:
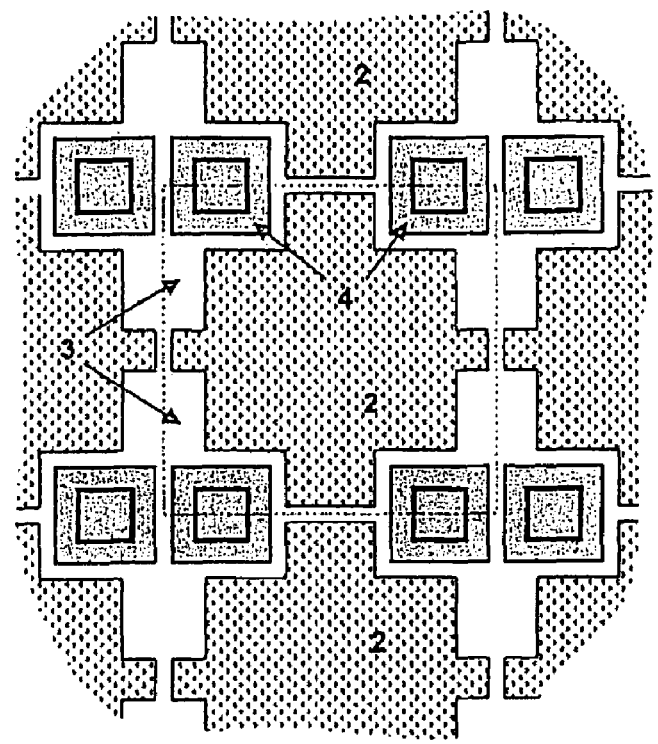
FIG. 1 is a plan view of part of an array assembly of elementary detectors in accordance with the previous state of the art.

FIG. 1 is a schematic partial plan view of an array of detectors according to the prior art. It shows:
- an initial substrate 1 on which all the structures are collectively formed;
- juxtaposed membranes which are sensitive to thermal radiation 2 and are each held suspended above substrate 1 at the level of the central part of their left and right edges;
- pairs of support legs 3 which have a collinear conformation;
- anchoring structures 4, in this particular case each structure is common to two adjacent pixels. The squares enclosed inside the structures represent the post used for connection to the substrate, the post extends vertically upwards.

Figure 2:
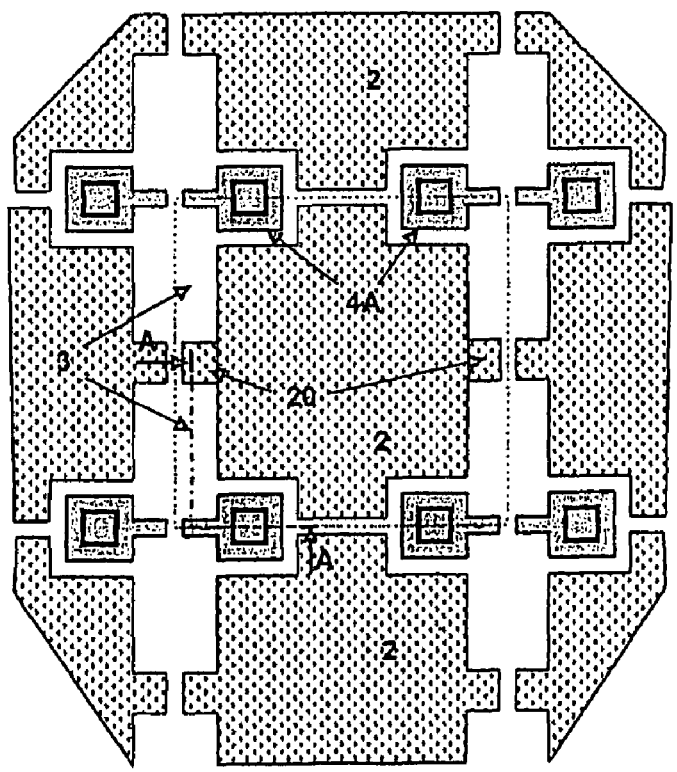
FIG. 2 is a plan view of part of an array assembly of elementary detectors in accordance with a first embodiment of the invention.

FIG. 2 shows a partial plan view of an array of detectors according to a first embodiment of the invention which comprises the same components but is characterized by the composition and shape of the structures which allow anchoring to the substrate. These structures comprise cross pieces 4A to which the ends of pairs of legs 3 opposite membrane 2 and the posts used for connection to the substrate which are indicated by the inner squares are attached.

Figure 4:
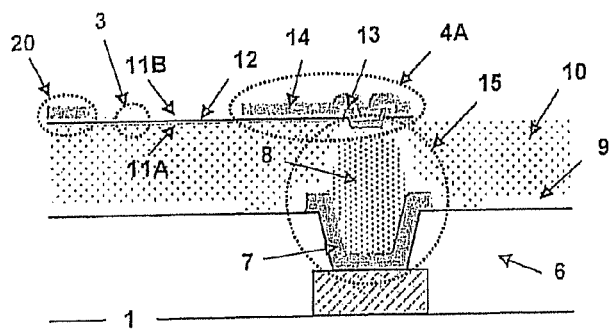
FIG. 4 is a detailed cross section through the axis of symmetry of the object of the invention in accordance with a particular, preferred implementation and along line AA shown in FIG. 2.

Here, mechanical connector 20 which attaches the ends of the legs to each other opposite the anchoring points consists, in a particular simple case, of a lateral outgrowth of membrane 2 to which the legs are attached. For the sake of continuity of materials, these elements are not represented separately from the membrane for the pixels in FIG. 2 which surround the central pixel and are identical to the latter in every respect. The materials used in the membrane which, in this case, define the composition of collinear connectors 20 of the legs must be attached to the materials of the legs in order to ensure overall stability of the structure. This attachment is advantageously obtained by extending at least part of the materials that constitute the legs in this connection area as shown in FIG. 4; for the sake of simplicity, FIG. 4 assumes that the same material 14 is used to form cross piece 4A and leg connector 20 but this is not a distinctive feature of the invention in any way whatsoever. A detailed description of how the layers in the membrane are formed falls outside the scope of this document.

Figure 5:
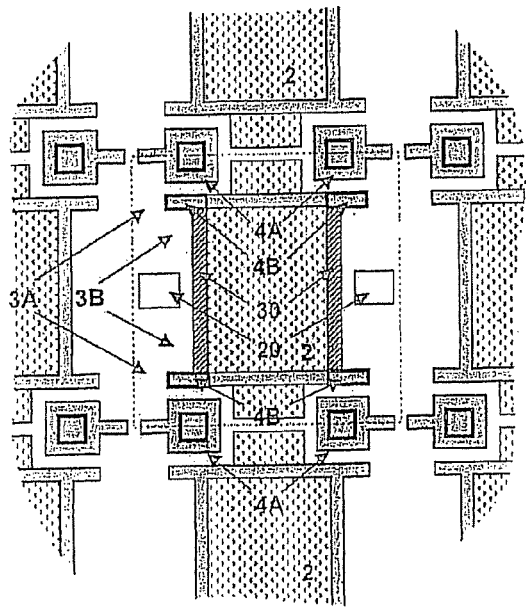
FIG. 5 is a plan view of part of an array assembly of elementary detectors in accordance with a second particular embodiment of the invention.

It is understood that the decision to show only anchoring structures which are common to two adjacent pixels in FIGS. 2 and 5 represents only one of several possible situations which is sufficient to provide an explanatory description of the invention. It is entirely possible to support each membrane with the aid of two or four, or even more, individualized anchoring points or, on the contrary, to share all or some of the anchoring points between four adjacent pixels without extending beyond the scope of the invention.

Figure 6:
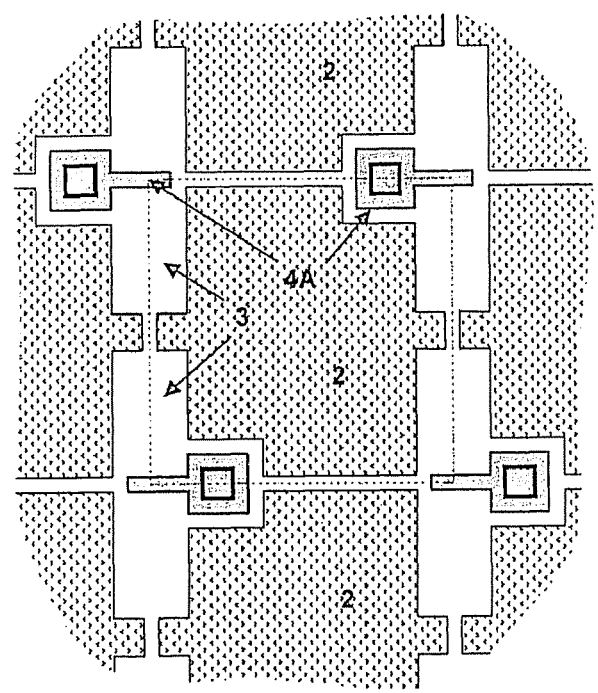
FIG. 6 is a plan view of part of an array assembly of elementary detectors in accordance with a first version of the first embodiment of the invention.

FIG. 6 proposes a first alternative embodiment of the invention in accordance with this first implementation whereby at least one cross piece per pixel (per membrane) is common to four pixels. FIG. 6 shows a situation where the membranes are all supported by four cross pieces, each cross piece being common to four pixels. The invention thus makes it possible to eliminate the overall size of some of the anchoring points within the footprint of a pixel. This layout is only functional in terms of individual dressing of pixels in the situation shown in FIG. 6 if special switches for selecting pixels in read mode are formed in the substrate in accordance with a known arrangement.

Figure 7:
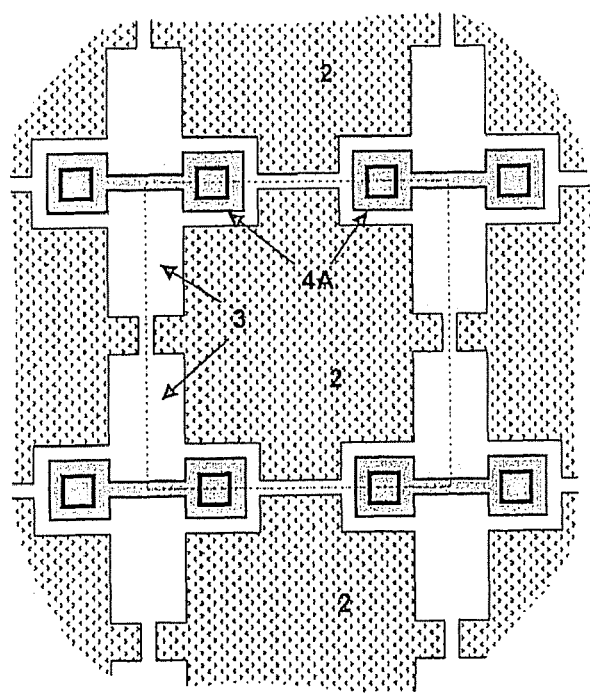
FIG. 7 is a plan view of part of an array assembly of elementary detectors in accordance with a second version of the first embodiment of the invention.

FIG. 7 proposes a second alternative embodiment of the invention in accordance with this first implementation whereby at least one cross piece per pixel is integral with two posts located at its ends. FIG. 7 shows a situation where all the membranes are supported by four cross pieces, each made in this particular shape. This layout makes it possible to improve the rigidity of the cross piece or to obtain redundant electrical or mechanical connectivity or to modify thermalization of the points that anchor the legs to the substrate in a non-exclusive manner. Also, electrical continuity between one of the two collinear pairs of legs integral with the cross piece and the other cross piece, i.e. electrical continuity between the two ends of the cross piece, can be established or, on the contrary, prevented by processing reserved for the conductive layers which constitute the cross piece.

Building on these examples, it is possible to deduce other particularly advantageous layouts in accordance with the invention without it being necessary to disclose them all explicitly.

There is no need to describe the construction of the membrane in detail here because those skilled in the art will already have all the necessary knowledge. Nevertheless, essential, relevant constructional features in accordance with the invention are described below.

Typically, at least one so-called sensitive or thermometric layer of material, the resistivity of which varies with temperature, for example doped amorphous silicon or an alloy of vanadium oxide, is associated with at least one layer, for example titanium or titanium nitride, thereby defining the conductive electrodes of the bolometric resistance thus formed. Absorption of thermal radiation is obtained by using one or more layers of material which absorb radiation in the desired wavelength range, for example silicon nitride or by directly exploiting the conduction properties of the electrodes if their sheet resistance is suitable for coupling electromagnetic waves. These principles are described extensively in the technical literature.

Legs 3 are typically produced using one or more mechanical dielectric (non-electrically conductive) layers typically made of silicon nitride or oxide or an intermediate material. At least two legs also comprise a conductive layer designed to ensure electrical continuity of the structure as described above.

Figure 3:
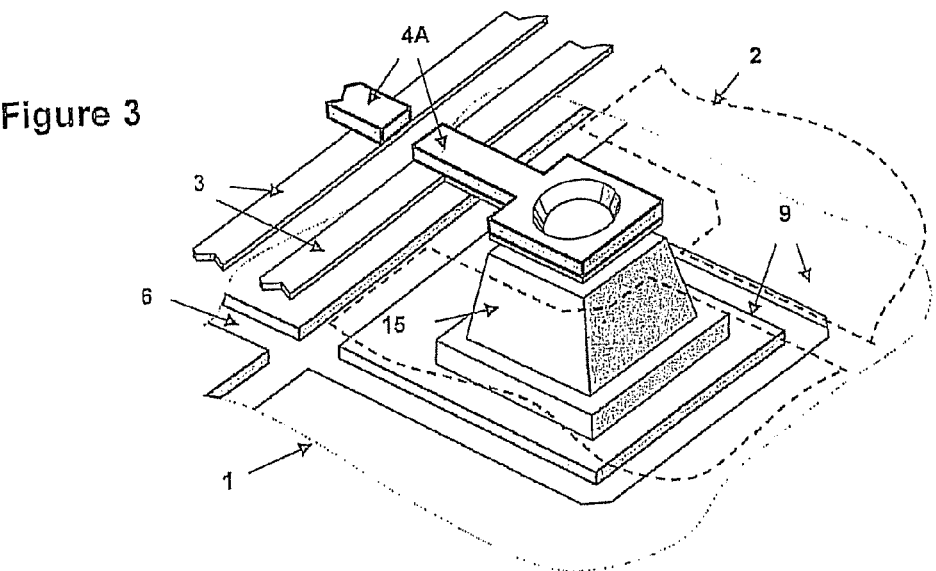
FIG. 3 is a schematic perspective view that focuses on the characteristic aspects of the detector in accordance with the implementation in FIG. 2.

FIG. 3 shows details of the structure according to the invention which comprises, in particular:

- A portion of legs 3 in the vicinity of their anchoring points which are, in this particular preferred case, each common to two adjacent detectors;
- Anchoring points consisting of cross pieces 4A and posts 15;
- The outline of membranes 2 represented by a dashed line and shown transparently for the sake of clarity of the diagram.

Construction in accordance with one non-limitative embodiment is explained below, reference being made to FIGS. 3 and 4.

The process starts by depositing a conductive layer 7 on the surface of substrate 1 which is traditionally passivated by all the dielectric layers 6 in which access openings are made. This conductive layer 7 is preserved in the immediate vicinity of said openings but removed elsewhere.

The process continues by applying a layer 8 which is preferably planarizing, but not critically so. Polyimide or a thick-mineral type deposited layer are adequate for this purpose. This layer is locally defined using well-known appropriate techniques with posts having side dimensions of the order of 2 to 4 µm and a finished height, relative to the surface of the substrate, of the order of 1.5 to 2 µm.

A reflective metallic layer 9 which surrounds the previously formed posts and is in contact with the edge of a conductive layer 7 is then deposited. Those surfaces which must be isolated from each other, especially electrical access points to the readout circuit, are defined by conventional etching.

A layer of sacrificial planarizing material 10, in the sense that it is intended to be removed at the end of the process, having a thickness of approximately 1.5 to 2.5 µm is applied to the structure, typically by spin coating. An organic polyimide layer, for example, is used. A very fine dielectric layer 11A of silicon oxide or nitride or an intermediate material having a thickness of the order of 10 to 50 nanometers is then deposited on the surface of this sacrificial layer, then a metallic layer 12 designed to ensure electrical continuity of the legs and possibly other electrical functions in the membrane is deposited.

One then uses conventional means to define this conductive layer in order to define its local limits depending on the functions to be obtained and which do not need to be described here. Openings are then made through layers 11A, 12 and the remaining excess thickness of layer 10 vertically above the posts. These openings, advantageously reduced to a side dimension of 1 µm or even less, are then metalized by layer 13 which is then removed everywhere except in the immediate vicinity of the openings. Electrical continuity is obtained from the substrate to layer 12, i.e. into the membrane.

A second dielectric layer 11B is optionally but preferably deposited; this is typically identical to layer 11A in terms of its composition and thickness. This layer is then removed from the surfaces that are designed to establish contact with the electrodes and the sensitive material(s) which is/are not shown and which is/are ultimately deposited on the surface of the structure in accordance with its specific characteristics and thicknesses which fall outside the scope of this explanation.

Rigid mechanical continuity between the extended connector elements of the legs is obtained naturally if one preserves the continuity of at least one layer and, preferably, all the layers that constitute the legs, at least over the footprint of the lateral extensions of the membrane that constitute these connector elements in accordance with the construction proposed in FIG. 2.

Finally, the sensitive material is defined using appropriate methods, especially in a way which removes the surfaces occupied by the legs and, if applicable, also vertically above structures 4A. Other layers and local definitions of materials specific to producing, in particular, functions of the membrane may be added or interposed and the degree of detail of certain operations may vary depending on the planned architecture without it being necessary or useful to describe all the details of such versions because these elements cannot be understood as aspects of the invention, the spirit of which emerges from the description as given.

The so-called distinctive cross piece structure is then finalized by depositing one or more layers 14, consisting of silicon nitride or oxide, for example, or an intermediate material or amorphous silicon having a thickness of the order of 50 to 500 nanometers. The outline of the cross piece, at least at the end which is joined to the legs, is obtained by etching to a width which is typically the same as the width of the legs, i.e., between 0.3 and 1 micrometer using an up-to-date technique. Assembly 14 is preferably preserved on top of material 13 as protection or even as a substitute for the latter if it is metallic.

The geometrical definition of the membrane and the legs is subsequently obtained by the next operation of etching the various materials, namely at least 11B, 12, 11A which constitute these structures until the underlying sacrificial layer is reached. The sole remaining task is then to remove sacrificial layer 10 by conventional means in order to complete the construction process.

Forming the cross piece and the post which supports it in accordance with this description only takes up a surface area having a side length of the order of 2 µm vertically above the post and a width of the order of 0.3 to 0.5 µm at the end of the cross piece on which the leg(s) rest, i.e. this takes up far less space than anchoring structures in accordance with the provisions of the prior art. As a result, extension of the membrane which collects radiative energy can be measurably improved compared with the prior art. It is also apparent that this space saving enhances the attractiveness of the invention in the second implementation described below in relation to FIG. 5.

The technique described above in order to obtain the post and the associated cross piece is only one example of effective implementation. It is possible to use techniques which are more usual in this field and involve not forming the post in advance but, on the contrary, forming the openings through layers 11A and 12 that constitute the legs, then through layer 10 until a conductive material deposited on the surface of the substrate is reached, these openings then being metalized, for example, by layer 13 or all the layers that are equivalent to layer 13 in this description. It is also possible to attach the cross piece to the top of post 15 as soon as the first mineral layer 11A is deposited by previously making layer 10 thinner in order to expose the top of posts 8. Dry etching methods capable of producing this result are well known to those skilled in the art.

The described preferred assembly advantageously preserves the constituent materials of the legs up to the top of the posts, thus preventing possible harmful mechanical weaknesses and ensuring electrical continuity in a straightforward way, when required, combined with extremely simple fabrication of the support cross piece. In one version, it is possible to form the cross piece by means of one or more conductive materials, for instance by extending metallic layer 13, typically in the shape shown in FIG. 3. There is then no longer any need to preserve the materials of the legs as far as vertically above the post.

A second advantageous design version is obtained if the sensitive bolometric material in the membrane is capable of effectively constituting the essential material of the cross piece. This typically applies to amorphous silicon. In this version, material 14 is used both in the membrane and in the sensitive bolometric material and as the main constituent of the cross piece and this simplifies general assembly of the entire structure considerably.

In a third version, material(s) 14 is not only used to build the cross piece, it is also used in the membrane as an inert passivation material or as a mechanical reinforcement for the active structures of the membrane.

A second embodiment of the invention is now described, making reference to FIG. 5. In this embodiment, the rigidity elements identified by reference 4B are integrated into the membrane. In other words, said membrane is equipped with cross pieces which are substantially of the same kind as that 14 described in relation to FIGS. 2 and 3. It is no longer a matter of using cross pieces to form points allowing anchoring to the substrate but using cross pieces to form mechanical attachment points and, if necessary, electrical continuity points on membrane 2.

The arrangement and role of these rigidity elements or cross pieces are readily apparent from FIG. 5 and their composition is readily apparent by extrapolating FIG. 4 bearing in mind the explanations already given. The same operations, composition and layouts in respect of these various layers, constituent materials and versions can be transferred directly to this second embodiment.

Mechanical continuity between the elements of each pair of legs is obtained in the example in FIG. 5 by solid surface 20 which is common to two pairs of legs located at the point where the pairs are joined and consist of the same materials as those which constitute the legs. For this reason, part 20 is therefore not shown separately from the membrane for the pixels surrounding the central pixel and is identical to the latter in every respect. Other detailed shapes and special different stacking of materials may be preferred, for example an additional element formed starting with layer 14 or other constituents used on the surface of layer 10.

With this second implementation, it is characteristic to provide mechanical rigidity between the two cross pieces of a single pair of legs. This rigidity is obtained, for instance, by means of a rectangular frame with an uninterrupted border located on the edges of membrane 2 as a direct extension of the materials of assembly 14 which constitute cross pieces 4B formed in accordance with the principle in the description given above.

The design of the frame as shown in FIG. 5, typically produced with a width of the order of 1 to 3 µm, is merely one preferred example which produces the desired result of securing the pairs of legs, even extremely thin legs, and incidentally but advantageously results in making the membrane rigid in the direction in which it flexes around the axis which is parallel to the legs.

Other configurations in accordance with the invention and a second embodiment may be obtained, for example by providing a bar (rather than a frame) 30 which is parallel to the legs consisting of assembly 14 which joins the two cross pieces of a single pair of legs and corresponds to the edges which are parallel to the legs of the previous frame. Ultimately, if a membrane which is not reinforced by assembly 14 is itself sufficiently inflexible, the cross pieces may be confined to only those portions bounded by the rectangles 4B shown in FIG. 5. Any extension of the end of the cross pieces where they join the membrane must then be defined on the basis of considering the resulting rigid mechanical attachment between the two cross pieces of a single pair of legs— this depends on the specific constructional features of the membrane.

Figure 9:
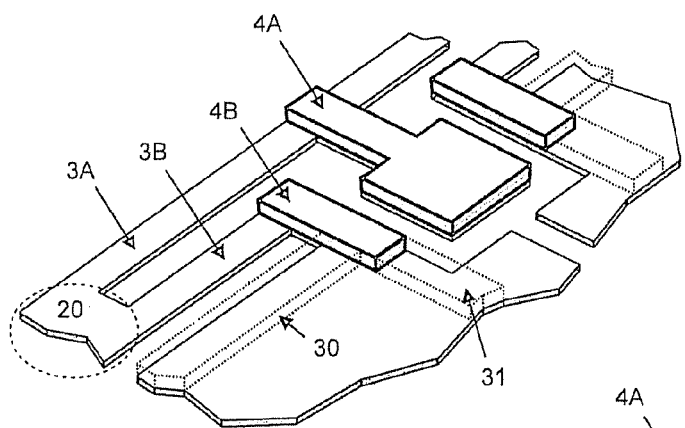
FIG. 9 is a schematic perspective view that focuses on the characteristic aspects of the detector in accordance with the implementation in FIG. 5.

FIG. 9 specifies this point on the basis of the construction proposed in FIG. 5—the posts and formations associated with the substrate are not shown for the sake of simplicity. Cross pieces 4B are represented in FIG. 5 by a solid line and are extended sufficiently if membrane 2 is itself sufficiently rigid. Bar 30, shown by a dotted line, is substantially longilinear and is advantageously added to the edge of the membrane in order to improve this rigidity. This rigid assembly can then be supplemented by a partial or complete frame 31 depending what is added and is also shown by a dotted line. If the body of the membrane is sufficiently rigid, the cross piece can be defined directly by means of a form which is the direct result of its constituent layers.

Figure 8:
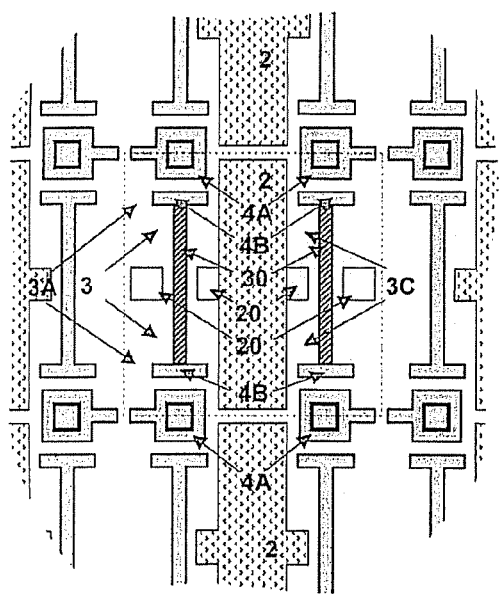
FIG. 8 is a plan view of part of an array assembly of elementary detectors in accordance with a version of the second embodiment of the invention.

A third implementation is shown in FIG. 8. In this implementation, the membrane is supported by a first pair of collinear legs 3C which are joined by means of a mechanical element 20B formed as indicated above for the first embodiment. The elements or bars 30 introduced in the explanation of the second implementation are separated from the membrane in order to form an elongated rigid structure or beam 30 which attaches pairs of cross pieces. A support for the assembly thus formed is obtained in the configuration disclosed for the second implementation by means of the other end of cross pieces 4B on which pairs of legs 3B, attached to pairs 3A by means of element 20A, rest.

It is possible to continue alternate development of parallel pairs of legs, in accordance with the implementations explained, beyond these examples as far as the core of the membrane. However, the geometric stability of the assembly is limited by the extent to which the mechanical properties of the layers used are mastered and the sensitive membrane must have a sufficient surface area to produce an optical response which is consistent with the sought-after optimized performance. From this point of view, the embodiment shown in FIG. 8 has one unbeatable advantage.

It can be deduced that one especially advantageous layout is obtained if the sensitive bolometric material used in the membrane is also capable of forming assembly 14 which is the essential constituent of cross pieces 4B and rigidity elements or beams 30, made of amorphous silicon for example, because it is sufficient to shape this material in the vicinity of the points where the legs join the membrane or on the beams as cross pieces in accordance with the invention integrally with the body of the membrane in order to obtain a highly thermally isolated detector.

Figure 10:
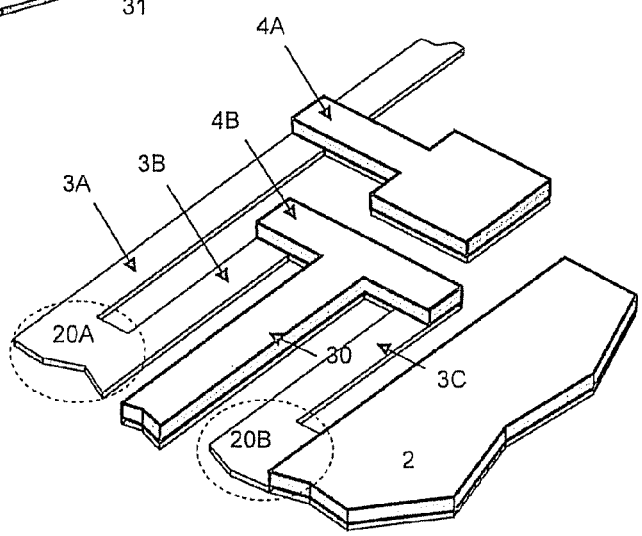
FIG. 10 is a schematic perspective view that focuses on the characteristic aspects of the detector in accordance with the implementation in FIG. 8.

A construction of this type is shown in FIG. 10; it has a configuration which is consistent with FIG. 8. In this particular advantageous case, bars 30 and all the cross pieces 4B and 4A, i.e. including those that are attached to the posts (like the formations associated with the substrate, these are not shown for the sake of simplicity), are formed using the same set of materials 14 which is also advantageously present in the membrane, for example, and typically if it constitutes the sensitive material. In the particular case in FIG. 10, connector elements 20A and 20B are only formed of the material that constitute the legs—other functional options are possible, as stated earlier.

The first two implementations of the invention detailed above as well as derivative implementations, for instance that in FIG. 8, can be used simultaneously and in combination in a single detector without any difficulty because, as indicated, the same principles and techniques can be advantageously applied. FIG. 5 is representative of an application involving simultaneous use of two implementations in a single structure. It should be noted that the invention makes it possible to practically double the length of the legs compared with the result obtained using the first embodiment alone which is exemplified in FIG. 2 and even triple this length using the example proposed in FIG. 8, the first embodiment, as stated, already improves the prior art by 40 to 50% for array detectors with very small repetition pitches. This result is partly associated with the method of constructing the structures used for anchoring to the substrate in accordance with the description given and which is especially space-saving in terms of surface area.

The invention therefore makes it possible to realize mechanically viable, extremely long equivalent legs, namely legs which are practically twice or even three times the size of the edge of the membrane and very thin and narrow. In terms of thermal resistance, the result obtained in this case is particularly good and it is achieved using a construction which is simple because it is developed building on a single constructional level on the original substrate. This ultimately results in moderate fabrication costs compared with assemblies that are markedly more complex and fabrication yields that are comparable with the prior art in practice.

This invention has applications in the field of image sensors that utilize bolometric detection, regardless of the detection frequency band or the type of bolometric material used to fabricate the imaging bolometers and reference bolometers, e.g. amorphous silicon (a-Si), vanadium oxide (Vox) (a metal).

The invention claimed is:

1. A device for detecting electromagnetic radiation comprising a substrate and at least one microstructure comprising a membrane which is sensitive to said radiation and extends substantially opposite and away from said substrate, said membrane being directly or indirectly mechanically attached to at least two elongated, straight axised and collinear support legs, wherein at least one of said support legs is mechanically connected to the substrate by a post which is integral with said substrate, said membrane also being in electrical continuity with the substrate,
wherein said at least two of said support legs are detached from the membrane along their full length and are attached to each other at the level of one of their ends to the membrane by means of a mechanical connector which is essentially co-planar with said support legs and the membrane, wherein the other end of the at least one of said support legs extending in a straight axis direction, is integral with a rigid cross piece,
wherein said cross piece:
is substantially co-planar with said support legs and said membrane,
has a first part which is integral with said post, and
has a second part which is integral with said first part and said support legs,
wherein said second part:
has an elongated shape, and
extends from said first part substantially perpendicular to the straight axis direction of said support legs.

2. The device for detecting electromagnetic radiation as claimed in claim 1, wherein said support legs are directly attached to said membrane, wherein at least one of said support legs is in electrical continuity with said membrane and said cross piece is in electrical continuity with said post.

3. The device for detecting electromagnetic radiation as claimed in claim 1, wherein said cross piece is common to two to four adjacent membranes.

4. The device for detecting electromagnetic radiation as claimed in claim 1, wherein one end of said cross piece is integral with said post and another end of said cross piece is integral with another post.

5. The device for detecting electromagnetic radiation as claimed in claim 1, wherein said cross piece is formed by at least one layer of a rigid material which is in contact with the constituent layers of said support legs.

6. The device for detecting electromagnetic radiation as claimed in claim 1, wherein said cross piece is in electrical continuity with said post, and said post is conductive thereby ensuring overall electrical continuity between the contacts on the surface of the substrate and the electrical functions in said membrane.

7. The device for detecting electromagnetic radiation as claimed in claim 1, wherein each of said support legs is indirectly attached to said membrane by means of collinear intermediate legs which are substantially co-planar with said support legs and said membranes, wherein each of said intermediate legs is parallel to said support legs with one end of said intermediate legs being attached to a second rigid cross piece which is integral with said membrane, and the other end of said intermediate legs being attached to said support legs by means of a mechanical connector element.

8. The device for detecting electromagnetic radiation as claimed in claim 7, wherein said second cross pieces are integral with said membrane and are attached by means of a rigid element which is also integral and co-planar with said membrane.

9. The device for detecting electromagnetic radiation as claimed in claim 7, wherein said membrane comprises a continuous rigid frame with two opposite sides of said frame having extensions, wherein one of said extensions forms said second cross piece capable of providing attachment to said intermediate leg.

10. The device for detecting electromagnetic radiation as claimed in claim 7, wherein said second cross piece is not directly attached to said membrane but is connected to said membrane via a third leg which is parallel to said support legs and to said intermediate legs, wherein one end of said third leg is attached to said second cross piece and the other end of said third leg is integral with said membrane at the level of a second mechanical connector element.

11. The device for detecting electromagnetic radiation as claimed in claim 7, wherein the constituent materials of said support legs extend inside said membrane or over a footprint of said second cross piece which is integral with said membrane thereby providing electrical connectivity and mechanical strength between the ends of said support legs and structures which keep them linearly tensioned.

12. The device for detecting electromagnetic radiation as claimed in claim 1, wherein a width of said cross piece is, at least at the end which is joined to said support leg, is of the same order as a width of said support leg.

13. The device for detecting electromagnetic radiation as claimed in claim 1, wherein a width of said second part of said cross piece is between 0.3 to 1.0 µm.

14. The device for detecting electromagnetic radiation as claimed in claim 1, wherein a width of said second part of said cross piece is substantially equal to a width of said support legs at an overlapped anchor point that is integral therebetween.

* * * * *